Nov. 22, 1960   J. P. ULLRICH, JR   2,961,233
TIME DELAY MECHANISM
Filed July 29, 1959   2 Sheets-Sheet 1
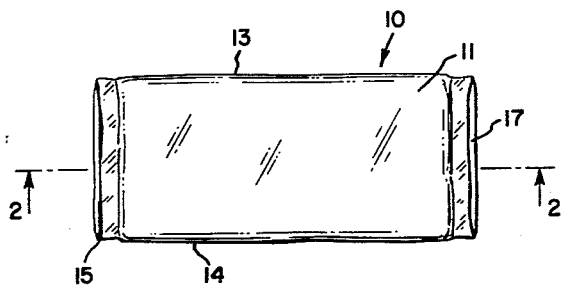
Fig. 1
Fig. 2
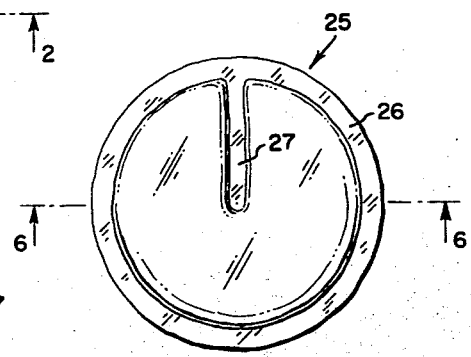
Fig. 5
Fig. 6
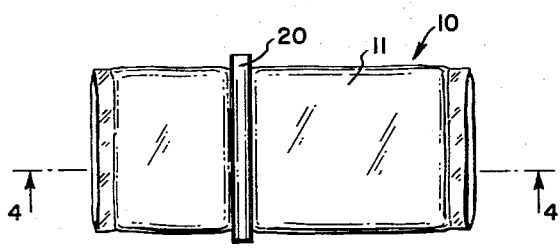
Fig. 3
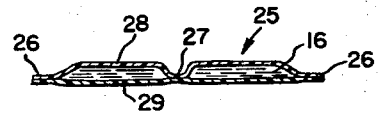
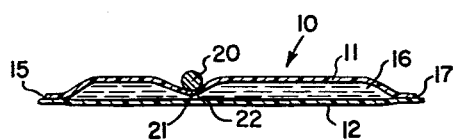
Fig. 4
INVENTOR.
JOHN P. ULLRICH, JR.
BY Alfred N. Feldman
ATTORNEY Nov. 22, 1960 J. P. ULLRICH, JR 2,961,233
TIME DELAY MECHANISM
Filed July 29, 1959 2 Sheets-Sheet 2
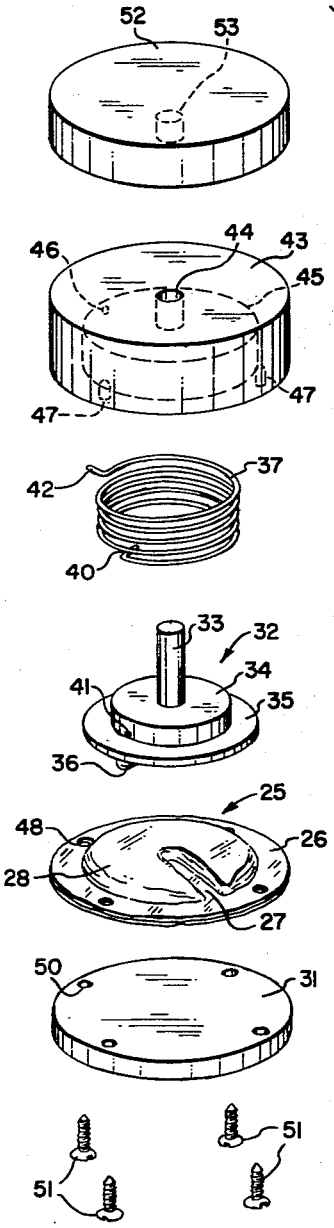
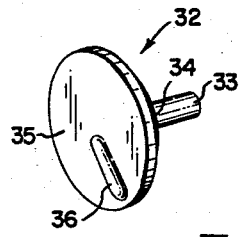
Fig-8
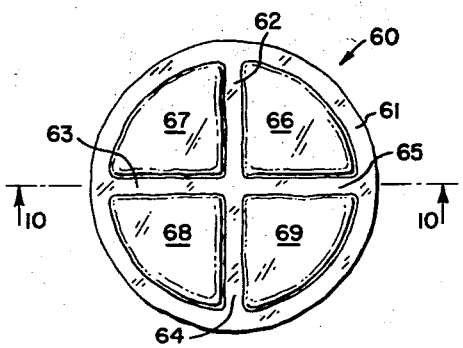
Fig-9
Fig-7
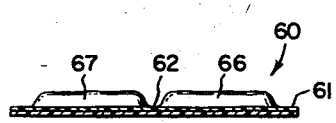
Fig-10
INVENTOR.
JOHN P. ULLRICH, JR.
BY Alfred N. Feldman
ATTORNEY

2,961,233
Patented Nov. 22, 1960

United States Patent Office

2,961,233
TIME DELAY MECHANISM

John P. Ullrich, Jr., St. Paul, Minn., assignor to Minneapolis-Honeywell Regulator Company, Minneapolis, Minn., a corporation of Delaware Filed July 29, 1959, Ser. No. 830,355

6 Claims. (Cl. 267—1)

The present invention is directed to a fluid controlled time delay mechanism or a fluid controlled mechanical impedance type device. More specifically, the present invention involves the restriction of movement of a mechanical member through the means of a viscous fluid.

It has been long recognized that it is possible to obtain a time delay type mechanism or a mechanical impedance by causing a mechanical member to operate through a viscous fluid. Most generally, this is accomplished by providing a piston type of unit which allows for leakage of the viscous fluid around the sides of the piston or through a passage linking the two sides of the piston. Numerous other viscous damped or viscous controlled time delay mechanisms have been evolved, but generally these devices are directed to the direct immersion of the damped member in the viscous fluid. The placement of the damped member directly in a viscous fluid creates sealing problems and problems related to unnecessary mechanical friction.

The present invention is directed to the use of a viscous fluid as a damping medium against a mechanical member but the normally encountered problems are avoided by the unique construction and principles of the presently disclosed device. It is therefore the primary object of the present invention to disclose a time delay or mechanical impedance device which utilizes a viscous fluid that is sealed from the damped or controlled unit and has little or no sealing or contamination problems.

A further object of the present invention is to disclose a time delay device that is capable of fabrication with delays of a fraction of a second up to many hours.

Another object of the present invention is to disclose a time delay mechanism which is small, cheap, and which has good repeatability so as to make it suitable for use with expendable items such as explosives.

Yet another object is to disclose a time delay mechanism or mechanical impedance means which can be constructed utilizing non-critical type materials and materials which cannot easily be detected by electrical or electronic equipment.

These and other objects will become apparent when the drawings are considered in light of the following detailed disclosure.

In Figures 1 through 4 there is disclosed a pliable sac filled with a viscous fluid, and which is disclosed with a rod like member to explain the theory of operation of the present invention;

In Figures 5 and 6 there is disclosed an annular shaped pliable sac having a radial sealed portion, which is used in the preferred embodiment of the present invention;

Figure 7 discloses an exploded view of a complete time delay device having a rotary motion;

Figure 8 discloses a rotor member of the device disclosed in Figure 7; and

Figures 9 and 10 disclose an annular pliable sac filled with a viscous fluid and having four radially sealed portions. The sac disclosed in Figures 9 and 10 forms the basis of a second embodiment in which the present invention can be readily utilized.

In Figures 1 and 2 there is disclosed a pliable plastic sac 10 which is generally rectangular in cross section. Sac 10 has an upper wall 11 and a lower wall 12 as well as the side walls 13 and 14. The sac 10 can be selected of any type of pliable material and can be readily considered as being formed of plastic. The sac 10 is then sealed at 15 in a fluid manner by any method that is convenient. The method of sealing the end at 15 could be heat, some type of cement, or a welding process well known in the plastics art. After the seal 15 is completed the sac 10 is substantially entirely filled with a viscous fluid 16 and the second seal 17 is provided to completely seal in the fluid 16 in the sac 10. The sac 10 disclosed in Figures 1 and 2 is soft and pliable as the fluid 16 has not been placed in the unit under any particular pressure.

In Figures 3 and 4 the sac 10 is disclosed with a rod 20 lying across the upper wall 11. The rod 20 depresses the plastic sac 10 at 21 reducing the cross section as disclosed at 22. If the rod 20 is then rolled or slid along the upper wall 11, the fluid 16 in the sac 10 is forced to flow through the reduced cross section 22. This creates an impediment to the movement of the rod 20 and the amount of the restriction of movement of rod 20 depends upon the viscosity of the fluid 16 the size of the cross section 22 and the normal frictional forces that exist.

In explaining the principle of operation of the present device by use of Figures 1 through 4, it becomes obvious that a time delay mechanism has been created wherein a viscous fluid 16 impedes the movement of a rod 20. There is no direct contact between the fluid 16 and the rod 20 and therefore there is no sealing problem in connection with the moving member. The only seals involved are 15 and 17 and these are permanent seals that are readily accomplished and which would be fluid tight under normal operating conditions. The device disclosed in Figures 1 through 4 is exemplary of the principle involved but is not a practical form of device. As such a practical embodiment is disclosed in Figures 5 through 8, as well as is a modification disclosed in Figures 9 and 10.

Figures 5 and 6 disclose a pliable sac 25 which is annular shape and which has a circumferentially sealed portion 26 and a radially sealed portion 27. The sac 25 is again filled with a viscous fluid 16. The sac has an upper wall 28 and a lower wall 29. A careful consideration of the sac disclosed in Figures 5 and 6 will show that it is in effect the same as that disclosed in Figures 1 through 4 except that the sealed ends 15 and 17 of Figure 1 have been brought around into a single member or sealed portion 27. In other words, the sac 25 is similar to sac 10 in that a continuous path exists from a sealed portion 27 around to a second sealed portion again designated as 27. It would be obvious that a roller member such as 20 could be placed on the surface of sac 25 and rotated with a pivot at the center of sac 25 and accomplish the same result as is disclosed in the device shown in Figures 1 through 4.

This is exactly what is done in the device disclosed in an exploded view of Figure 7. The sac 25 having the circumferentially sealed portion 26 and the radially sealed portion 27 is placed on a flat plate 31. The flat plate 31 rests against the wall 29 of the sac 25 and forms the bottom of the unit disclosed in Figure 7. Placed directly above the sac 25 is a rotor 32 which has a shaft 33, a centering ring 34, a flat plate 35, and a wiper member 36. The rotor 32 is supported by shaft 33 in a manner which will be described later but has plate 35 parallel to sac 25. The wiper 36 of the rotor 32 rides on the top 28 of the sac 25. The wiper 36 corresponds in function to the rod 20 in Figures 1 through 4.

A resilient member in the form of a spring 37 is utilized to cause the rotation of rotor 32. The spring 37 has an inwardly projecting end 40 that passes into hole 41 in rotor 32. This anchors spring 37 to the rotor 32 and centers the spring around the centering member 34. The spring 37 further has an outward projection 42 which is used to anchor the second end of spring 37.

The rotor 32, and spring 37 are held in place by a plastic block 43. The block 43 forms part of the pivot means by providing a guide hole 44 through which passes the shaft 33. A recess 45 is provided to encircle the spring 37 and part of the rotor 32. A hole 46 is provided in the edge of the recess 45 and is a means by which the end 42 of spring 37 is anchored. Block 43 further has a plurality of threaded holes 47. The holes 47 are in line with holes 48 and 50 respectively in the sac 25 and plate 31. Four screws 51 pass through the holes 50, and 48 and into the threaded holes 47 to assemble the unit in the desired relationship. A plastic block 52 is provided with a hole 53 which is a force fit on the end of shaft 33 and acts as a means to wind the spring 37 to its first or biased position.

In Figure 8 there is supplied an isometric view of the rotor 32 to more clearly disclose the wiper 36.

The operation of the assembled device disclosed in Figure 7 will be explained. When the device disclosed in Figure 7 is tightly assembled by means of the screws 51, the wiper 36 is placed against the radial sealed portion 27. The spring 37 is in its free or unbiased condition. In order to bias the spring 37 the block 52 is slowly rotated thereby forcing the rotor 32 to turn. The rotor 32 forces the wiper 36 over the surface or top 28 of the sac 25 until the wiper 36 again reaches the radial sealed portion 27. At this point the spring 37 has been coiled through approximately one turn and provides the necessary bias to return the rotor 32 to its original position. The biasing force of spring 37 causes the rotor 32 to move the wiper 36 across surface 28 and thereby obtaining the time delay action desired. The time delay is accomplished since the wiper 36 rides against the side of the sac 25 so as to reduce the cross section of the sac or fluid passage. As the fluid 16 flows through the restriction caused by the wiper 36 riding on the side of sac 25, the wiper moves from its bias position to its unbiased position at a rate determined by the flow of the fluid through this reduced cross section of the sac.

While no specific materials have been mentioned in the construction of the unit disclosed in Figure 7, it is obvious that all of the unit or part of the unit could be constructed from plastic or other nonmetallic materials. The rotor 32 could readily be formed of a metal or a plastic member as well as could spring 37. If a nonmetallic unit were desired, the screws 51 could be replaced by pins of plastic or merely the use of a plastic cement. It becomes obvious that the present unit could be constructed from conventional metallic members or plastic members thereby yielding a unit which is more difficult to be detected by electrical or electronic means. The time delay obtained with the disclosed unit can be controlled by a selection of the type of fluid and the clearances between the members. By properly selecting the clearance between the wiper 36 and the plate 31 the sac 25 can be brought under a slight or a heavy pressure by the rotor thereby changing the time characteristics of the unit. It becomes thus obvious that many possible embodiments can be readily accomplished within the skill of those versed in the art.

As an example of one of these many variations of embodiment there is disclosed in Figures 9 and 10 a sac 60 having a circumferentially sealed edge 61 and four radial seals 62, 63, 64, and 65. This leaves four pie shaped sections 66, 67, 68, and 69. This type of unit could be directly incorporated in the device disclosed in Figure 7 and would operate in exactly the same fashion as described in connection with Figure 7. The sac 60 of Figures 9 and 10 could also be incorporated in a unit wherein a rotor of the type disclosed at 32 could be replaced with a rotor having four equal wipers similar to wiper 36 on the disclosed rotor 32. This would yield a very high impedance unit which could have an exceedingly long delay, even reaching into many hours.

The device presently disclosed can be manufactured with any number of possible variations which would be obvious to one skilled in the art. While two specific production type variations have been disclosed, the applicant wishes to be limited in his present invention only by the scope of the appended claims.

I claim as my invention:
1. In a liquid controlled time delay device: a sealed circular pliable sac containing a viscous liquid; said sac having a radial sealed portion extending from the center of said sac to the circumference of said sac; a circular rotor parallel to an exterior side of said sac and having a projection forming a radial wiper; said radial wiper corresponding in length to said radial sealed portion of said sac; pivot means adapted to hold said rotor means against said exterior side of said sac and thereby reduce the cross section of said sac; a spring joining said rotor and said pivot means to move said rotor from a biased position to an unbiased position; and said radial wiper rotating with said rotor means in a plane parallel to said side of said sac and causing said liquid to flow wholly within said sac through said reduced cross section; said radial wiper movement being controlled from said biased position to said unbiased position by the rate of flow of said liquid through said reduced cross section of said sac.

2. In a fluid controlled time delay device: a circular pliable sac containing a viscous fluid; said sac having a radial sealed portion extending from the center of said sac to the circumference of said sac; circular rotor means parallel to an exterior side of said sac and having a projection forming a radial wiper; said radial wiper corresponding in length to said radial sealed portion of said sac; pivot means adapted to hold said rotor means against said exterior side of said sac and thereby reduce the cross section of said sac; resilient bias means joining said rotor means and said pivot means to move said rotor means from a biased position to an unbiased position; and said radial wiper rotating with said rotor means in a plane parallel to said side of said sac and causing said fluid to flow wholly within said sac through said reduced cross section; said radial wiper movement being controlled from said biased position to said unbiased position by the rate of flow of said fluid through said reduced cross section of said sac.

3. In a fluid controlled delay device: a flat circular pliable disk-shaped sac containing a viscous fluid; said sac having a radial sealed portion; circular rotor means adjacent to an exterior side of said sac and having a projection forming a radial wiper; pivot means adapted to hold said rotor means against said exterior side of said sac and thereby reduce the cross section of said sac; resilient bias means joining said rotor means and said pivot means to move said rotor means from a biased position to an unbiased position; and said radial wiper rotating with said rotor means against said side of said sac in a plane parallel to said side and causing said fluid to flow wholly within said sac through said reduced cross section; said radial wiper movement being controlled from said biased position to said unbiased position by the rate of flow of said fluid through said reduced cross section of said sac.

4. In a liquid controlled time delay device: a sealed circular pliable sac containing a viscous liquid; said sac having radial sealed portions extending from the center of said sac to the circumference of said sac; a circular rotor parallel to an exterior side of said esac and having projections forming radial wipers; said radial wipers corresponding in length to said radial sealed portions of said sac; pivot means adapted to hold said rotor against said exterior side of said sac and thereby reduce the cross section of said sac; a spring joining said rotor and said pivot means to move said rotor from a biased position to an unbiased position; and said radial wipers rotating with said rotor in a plane parallel to said side of said sac and causing said liquid to flow wholly within said sac through said reduced cross section; said radial wipers being controlled from said biased position to said unbiased position by the rate of flow of said liquid through said reduced cross section of said sac.

5. In a fluid controlled delay device: a flat circular pliable disk-shaped sac containing a viscous fluid; said sac having radial sealed portions; circular rotor means adjacent and parallel to an exterior side of said sac and having projections forming radial wipers; pivot means adapted to hold said rotor means against said exterior side of said sac and thereby reduce the cross section of said sac; resilient bias means joining said rotor means and said pivot means to move said rotor means from a biased position to an unbiased position; and said radial wipers rotating with said rotor means against said side of said sac and causing said fluid to flow wholly within said sac through said reduced cross section; said rotor means movement being controlled from said biased position to said unbiased position by the rate of flow of said fluid through said reduced cross section of said sac.

6. In a liquid controlled time delay device: a flat circular pliable disk-shaped sac containing a viscous liquid and having a radial sealed portion; a wiper applied to an exterior surface of said sac and thereby reducing the cross section of said sac; and said wiper moving in a plane parallel to said sac and causing said fluid to flow wholly within said sac through said reduced cross section; said wiper movement being controlled by the rate of flow of said liquid through said reduced cross section of said sac.

References Cited in the file of this patent
UNITED STATES PATENTS

| | | |
|---|---|---|
| 2,833,347 | Terry | May 6, 1958 |
| 2,905,430 | Deist | Sept. 22, 1959 |

FOREIGN PATENTS

| | | |
|---|---|---|
| 1,063,466 | France | Dec. 16, 1953 |